United States Patent [19]

Preston

[11] Patent Number: 4,578,586

[45] Date of Patent: Mar. 25, 1986

[54] CHEMICAL AGENT MONITOR AND ALARM DEVICE

[75] Inventor: Jonathan M. Preston, Ottawa, Canada

[73] Assignee: Her Majesty the Queen in right of Canada, as represented by the Minister of National Defence of Her Majesty's Canadian Government, Ottawa, Canada

[21] Appl. No.: 574,538

[22] Filed: Jan. 27, 1984

[30] Foreign Application Priority Data

Mar. 30, 1983 [GB] United Kingdom ................ 8308783
Sep. 30, 1983 [GB] United Kingdom ................ 8326205

[51] Int. Cl.[4] ........................ G01T 1/18; G01D 11/24; G08B 23/00

[52] U.S. Cl. ................................ 250/382; 250/336.1; 250/389; 73/431; 340/693

[58] Field of Search ............... 250/282, 287, 379, 381, 250/382, 386, 387, 388, 336.1, 526, 288, 389; 324/464, 465, 469; 73/431, 864.34; D10/106, 81; 374/208; 340/632, 693

[56] References Cited

U.S. PATENT DOCUMENTS 4,315,432 2/1982 Newton ................................ 73/431

FOREIGN PATENT DOCUMENTS 1573678 8/1980 United Kingdom .
1596916 9/1981 United Kingdom .

OTHER PUBLICATIONS

"Plasma Chromatography of Phosphorus Esters", by J. M. Preston et al–Analytical Chemistry, vol. 49, No. 12, Oct. 1977.

"Plasma Chromatography", by Francis W. Karasek from Analytical Chemistry, vol. 45, p. 710A, Jul. 1972.

Technical Paper No. 264, entitled "The Detection of Mustard Agent Vapour Using Ion Mobility Techniques (U)", by D. A. Blyth, dated Jan. 1980.

Brochure entitled "Chemical Agent Monitor", by Graseby Dynamics Ltd., dated 10/82.

*Primary Examiner*—Alfred E. Smith
*Attorney, Agent, or Firm*—Hayes, Davis & Soloway

[57] ABSTRACT

The specification describes a case for use with a hand-portable chemical agent detector for continuously monitoring an atmosphere for the presence of predetermined chemical agents. The detector having means for ionizing air samples and providing at an output terminal electrical signals representative of the mobility spectrum of ionized chemical vapors produced by the ionizing means. The case comprises means defining a chamber in the case for supporting and removably enclosing the detector, means for communicating ambient atmosphere to the chamber, electrical circuit means in the case, the circuit means being adapted to be detachably connected to the detector output terminal when the detector is positioned in the chamber and being responsive to the electrical signals for producing an alarm signal when the signals detect a chemical agent concentration in the atmosphere exceeding a predetermined concentration level, and alarm means responsive to the alarm signal.

18 Claims, 6 Drawing Figures

CHEMICAL AGENT MONITOR AND ALARM DEVICE

This invention relates to a chemical agent detector and alarm.

BACKGROUND OF THE INVENTION

Chemical agent detecting and alarm devices are devices which have been developed for use by armed personnel in the event of chemical warfare to detect the presence of chemical agents or vapours and activate an alarm when the concentration of a detected agent exceeds a predetermined safe level.

The instruments are designed to subject an air sample to tests which detect the presence and concentration of certain chemical agents of interest and activate an alarm when the tests reveal an unsafe concentration. The devices are used in essentially two modes. In an automatic mode, they are used as standalone units at a desired site to continuously monitor ambient atmosphere at that site. A remote alarm may be connected to a device for communicating the alarm signal to another site. In a manual mode, they are carried by a user and manipulated to sample air immediately adjacent surfaces suspected of being contaminated. In order to conveniently facilitate the latter, the devices must be relatively light and portable.

While portable, many conventional devices tend to be sufficiently heavy and awkward that they cannot be conveniently and comfortably carried in one hand of a user and, thus, have tended to assume backpack configurations for use in the manual mode discussed above. Flexible tubes manipulated by the user extend from the backpacks for supplying air samples to the devices. Not only does this arrangement make the various meters on the instrument difficult for the user to read, the flexible tubes tend to absorb chemical agents which results in a reduction of both the response speed and sensitivity of the devices.

Some conventional devices utilize chemical tests to determine the identity and concentration of chemical agents in air samples. This places significant limitations on the number and type of chemical agents which can be monitored within the framework of a relatively light, portable device because the necessary apparatus and chemicals are space consuming and relatively heavy. In addition, the tests render the devices relatively complex in terms of design, structure, operation and maintenance. A particularly important consideration insofar as maintenance is concerned is the decontamination of devices which have been exposed to chemical agents. Chemical agents tend to display low surface tension properties and thus tend to migrate to sharp corners, joints and like discontinuities on exposed surfaces. Devices having relatively complex mechanical designs thus tend to be difficult to decontaminate.

A recently developed chemical agent detecting device overcomes many of the aforementioned drawbacks. Structurally, the device is extremely light and compact so that it can be comfortably and conveniently carried in one hand by a user. A rigid, tubular probe extends from one end of the device and serves as an inlet for admitting air samples into the device. Thus, the device is easily manipulated, the displays are readily accessible to the user and there is little, if any, absorption of chemical agents by the probe.

The device makes use of ion mobility principles to determine the identity and concentration of chemical agents of interest. In essence, the air samples drawn into the unit are ionized to produce primary positive and negative ions. The ions undergo complex ion molecule reactions which result in a mixture of ions and ionic clusters which are urged to a collector in the device. The differences in mobilities of the ions and ionic clusters result in different arrival times at the collector. The collector current as a function of time represents a mobility spectrum for the sample. Each peak is indicative of a particular chemical agent or species. The drift time indicates the identity of the species and the magnitude indicates the concentration of the species. After amplification, the collector current is fed to a microprocessor which determines the identity of the species represented by each peak on the basis of the drift time and the concentration of the species based on the height of the peak and causes this information to be output to a display.

While the latter device is highly suited for use in the manual mode, it is not particularly well suited for use in the automatic mode because it cannot be constructed to rest on a support surface in the proper position without hampering its use in the manual mode, it is fragile and therefore susceptible to damage if left unattended and cannot be provided with sufficient battery capacity to enable it to be used continuously for extended periods of time.

SUMMARY OF THE INVENTION

The present invention seeks to overcome the disadvantages of devices of the type just described by providing a case which not only supports and protects the chemical agent detector during storage, but enables the detector to be used in the automatic mode and which functions as an alarm responsive to the detector output.

Generally, the present invention provides a case for use with a hand-portable chemical agent detector for continuously monitoring an atmopshere for the presence of predetermined chemical agents, the detector having means for ionizing air samples and providing at an output terminal electrical signals representative of the mobility spectra of ionized chemical vapours produced by the ionizing means. The case comprises means defining a chamber in the case for supporting and removably enclosing the detector, means for communicating ambient atmosphere to the chamber, electrical circuit means in the case, the circuit means being adapted to be detachably connected to the detector output terminal when the detector is positioned in the chamber and being responsive to the electrical signals for producing an alarm signal when the signals detect a chemical agent concentration in the atmosphere exceeding a predetermined concentration level, and alarm means responsive to the alarm signal.

BRIEF DESCRIPTION OF THE DRAWINGS

These and other features of the invention will become more apparent from the following description in which reference is made to the appended drawings wherein.

DESCRIPTION OF A PREFERRED EMBODIMENT

Figure 2:
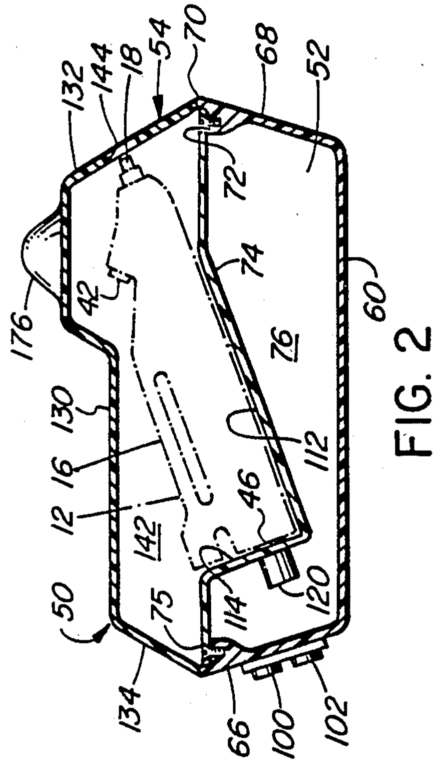
FIG. 2 is a longitudinal cross-sectional view, taken along line 2—2 of FIG. 4, of the case in a closed condition with the detector operatively disposed in the case.
Figure 5:
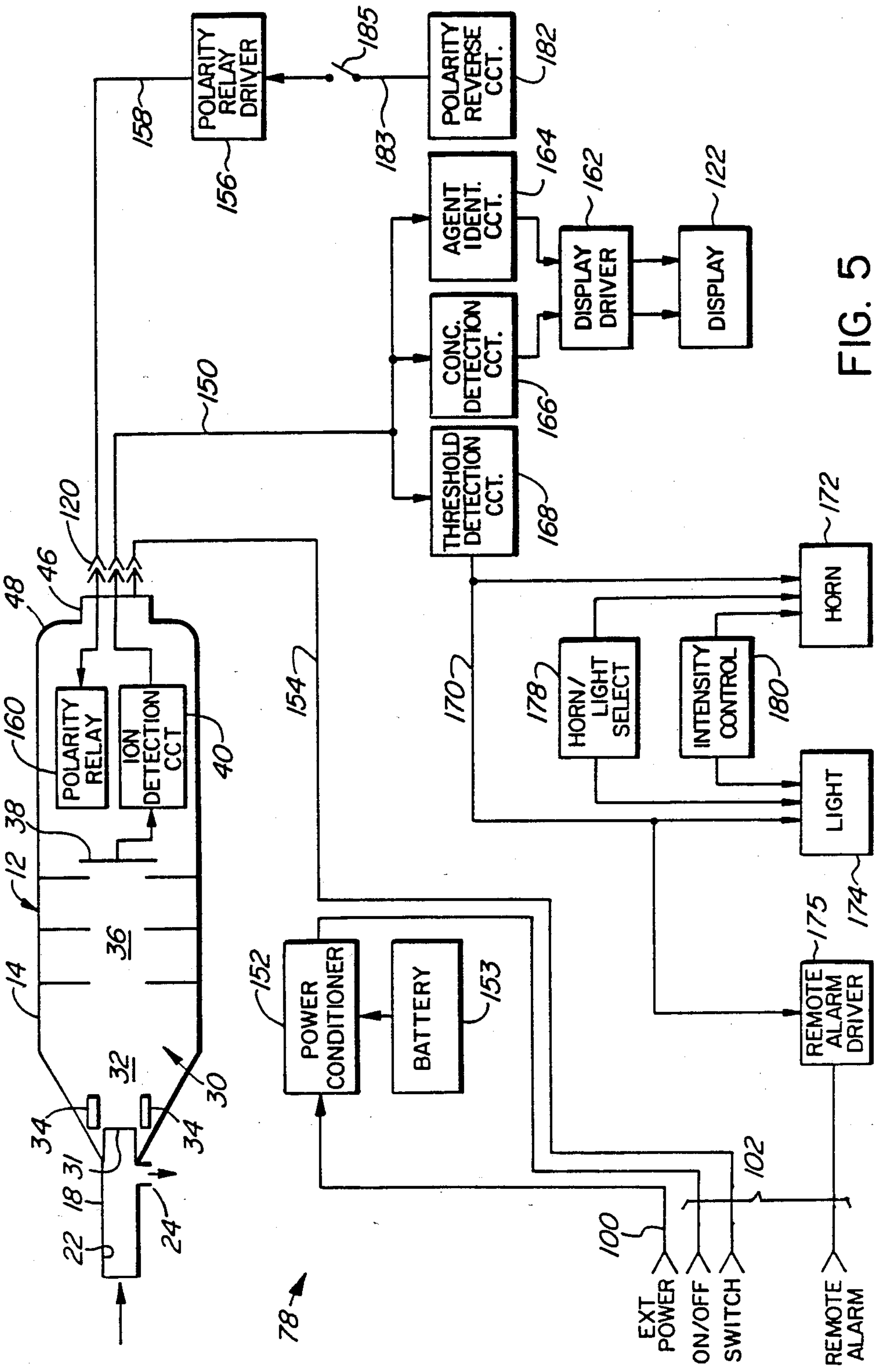
FIG. 5 is a block diagram view of an electrical circuit of the present invention.
Figure 6:
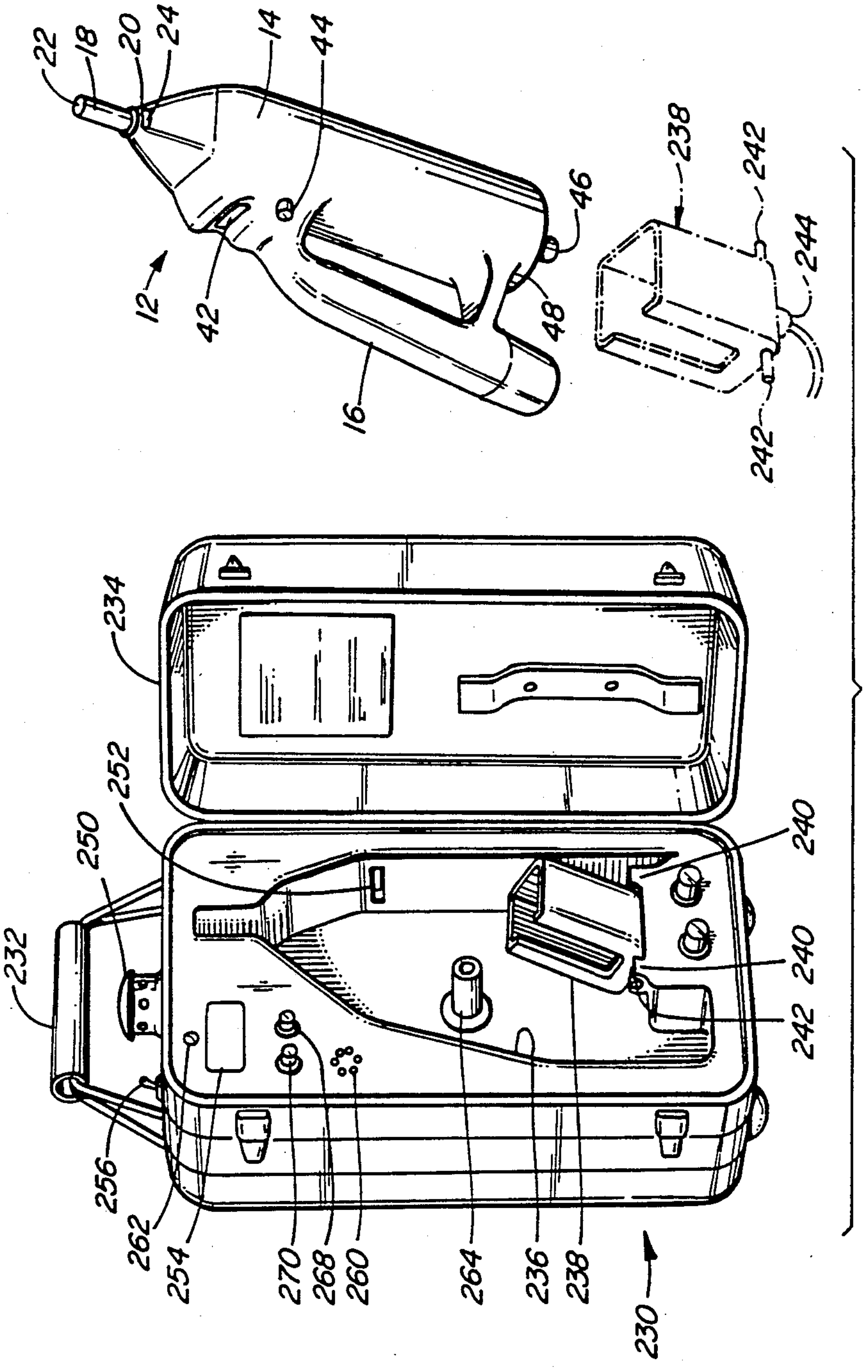
FIG. 6 is a perspective view of an alternative construction of the case and the detector.

The drawings illustrate a chemical agent detector and alarm unit 10 for use with a chemical agent detector 12 (FIGS. 2, 5 and 6). Detector 12 does not itself constitute the present invention. However, a brief description of its construction and operation is included hereinbelow with reference to FIGS. 2, 5 and 6 in order to facilitate understanding of the present invention.

Detector 12 is a light and compact device which can be comfortably carried in one hand by a user. The unit includes a tubular, parallelepiped casing 14 having a handle 16 which extends from the casing in a generally parallel fashion and which serves as a housing for a cylindrical battery (not shown). A rigid tubular probe 18 extends axially from one end 20 of the casing and defines a sample flow air inlet passage 22. A sample flow outlet passage 24 is formed adjacent the probe.

The casing is formed with an analyzing chamber 30 having a membrane 31 which preferentially passes agents and blocks water and other atmospheric gases, an ionization region 32 in which a suitable ionizing source 34 is mounted, and a drift region 36. The ionizing source may be a radioactive source or means for generating an appropriate electrical discharge. A closed-circuit path circulates carrier gases through the analyzing chamber by means of suitable pumps (not shown) which also effect the flow of sample gas. A collector 38 is disposed at the end of the chamber remote from probe 18.

As the carrier gas containing agent, if it is present in the atmosphere, flows through the ionization region, primary positive and negative ions are produced. Thereafter, a series of ion molecule reactions take place to produce a mixture of ions and ionic clusters. The charged species are electronically pulsed into the drift region towards collector 38. Differences in the mobility of the ions result in different arrival times at the collector. The collector current represents the mobility spectrum for the sample. Each peak of the mobility spectrum represents a particular chemical agent. The drift time associated with each peak is indicative of the identity of the agent while the magnitude or height of the peak is indicative of the concentration of the agent.

The collector current is amplified and fed to a detection circuit 40 which, for each detected peak, compares the component of the signal representing the drift time against predetermined drift times for known, chemical agents and activates a display 42 to indicate the identity of the detected species if a match is made. Circuit 40 also determines the concentration of the species on the basis of the component of the signal representing the height of the peak for output to display 42. A polarity switch 44 is provided for selective actuation by the user for periodically switching the polarity of the voltage source in the detector in order to monitor both positive and negative ions produced.

Devices of the above described type are known and, accordingly, detector 12 will not be described in further detail. However, further particulars of the construction and operation of devices of this type may be obtained by reference to British Patent Specifications Nos. 1,573,678 published Aug. 28, 1980 and 1,596,916 published on Sept. 3, 1981, both of which have been assigned to Pye (Electronic Products) Limited.

While the above described detector is well suited for manual use in analyzing surfaces, it is not as well suited for monitoring atmospheric air in an unsupervised condition. For example, the device cannot simply be placed on the ground at a site at which it is desired to monitor the atmosphere because the boundary layer of grass, bushes and the like may adversely affect the output of the device. Modification of the structure of the unit such that its inlet probe is kept above the boundary layer when used in the automatic mode would render the resulting device cumbersome to use in the manual mode. In addition, the device cannot be provided with sufficient battery capacity to permit it to be used for extended periods of time in the automatic mode. The present invention provides a case for use with a detector of the aforementioned type so that the detector is rendered suitable for use in an unattended, atmospheric air monitoring mode. Additionally, the present invention seeks to provide a case which functions as an alarm which is responsive to the electrical output of the detector.

With particular reference to FIGS. 1–4, detector and alarm unit 10 includes a case 50 having a first body portion or base 52, a second body portion or lid 54, and a pair of handles 56, 56 pivotally mounted on opposed side walls of the base. FIG. 2 illustrates the detector operatively disposed in the base for use of the combination in an atmospheric air monitoring mode.

Base 52 is comprised of a generally rectangular bottom wall 60 from which extend a pair of opposed, upstanding planar side walls 62, 64 and a pair of opposed, upstanding, planar end walls 66, 68. The opposed walls diverge upwardly and outwardly. The side and end walls terminate in a marginal edge 70 disposed in a plane which substantially parallels bottom wall 60. As best shown, in FIGS. 1–3 the side, end and bottom walls are substantially uninterrupted and the external corners of the base are rounded to minimize sites to which chemical agents might migrate and collect. An internal shoulder 72 is formed on the inner side of the side and end walls and is slightly spaced from edge 70 so as to form a support for a partition or panel 74 on which the detector is mounted. The panel is removably secured to the base by means of screws 75 threaded into the shoulder. The base and panel together define a chamber 76 which contains electrical circuitry 78 and a relatively high capacity d.c. battery (FIG. 5).

Figure 3:
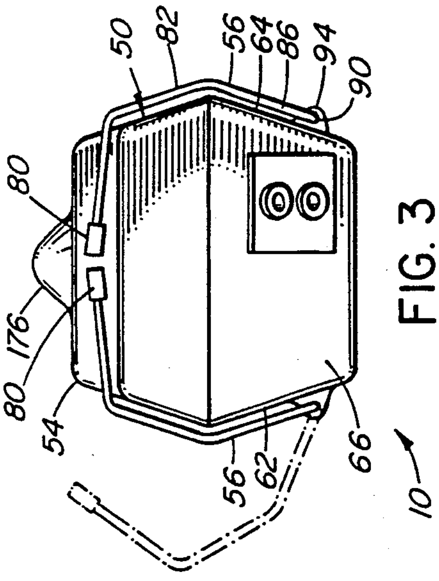
FIG. 3 is an end view of the case.

Each handle 56 includes a grip portion 80 and a pair of wire-like arms 82 and 84 whose free ends 86 and 88, respectively, are received in longitudinally extending blind holes 90 and 92 formed in embossments 94 and 96 in the side wall adjacent the bottom wall of the casing. Thus, as best shown in FIG. 3 the handles are adapted to pivot transversely of the casing between a carrying position in which the handles overlie the lid and maintain it in a closed position and a spread position which permits the lid to be opened and the detector to be inserted or removed. The handles and/or lid may be arranged to be releasably secured to one another if so desired.

A jack 100 for an external power source, and a jack 102 for a remote display unit are secured to end wall 66 of the base.

Figure 1:
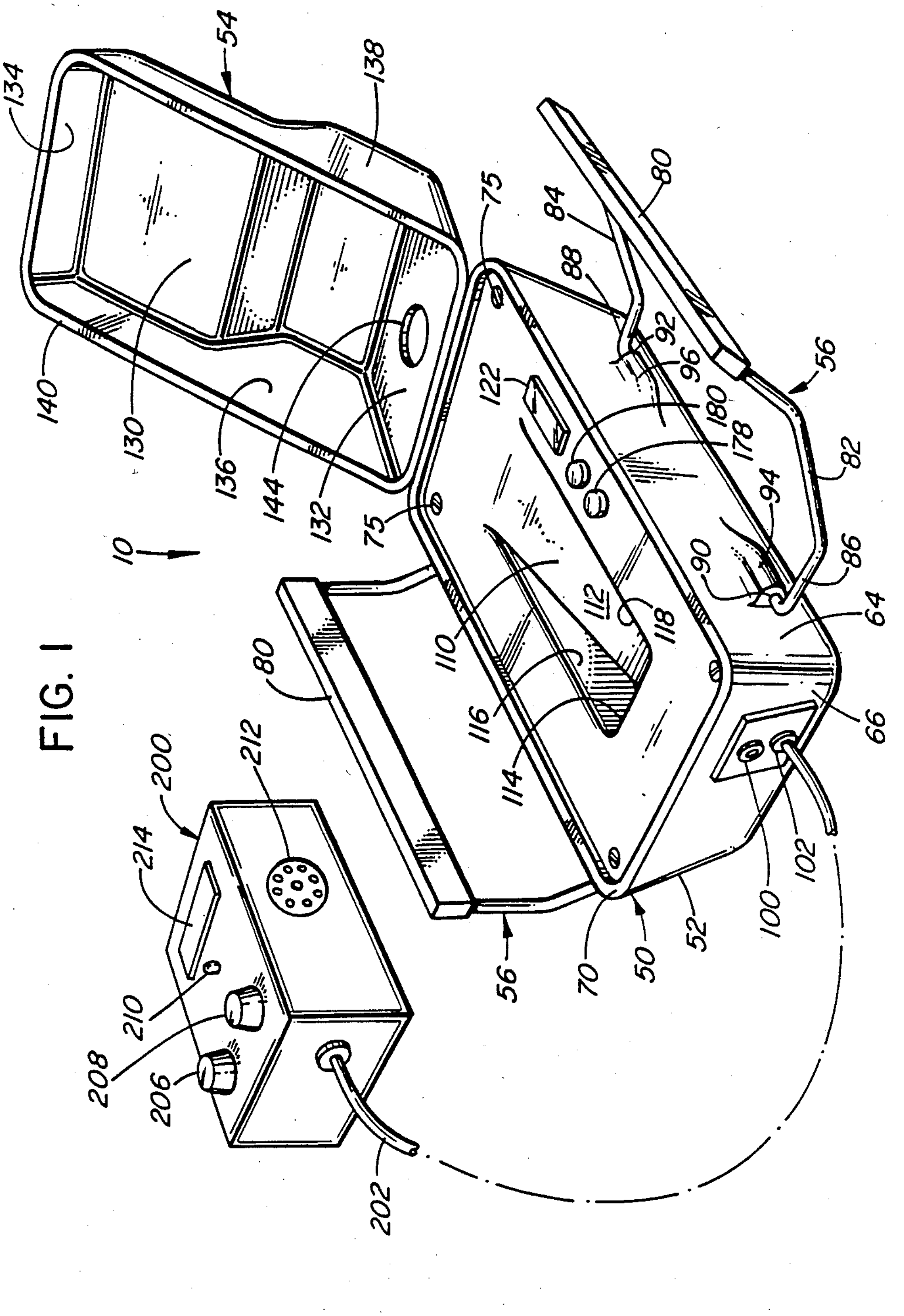
FIG. 1 is a perspective view of the apparatus of the present invention illustrating the case in an opened condition.
Figure 4:
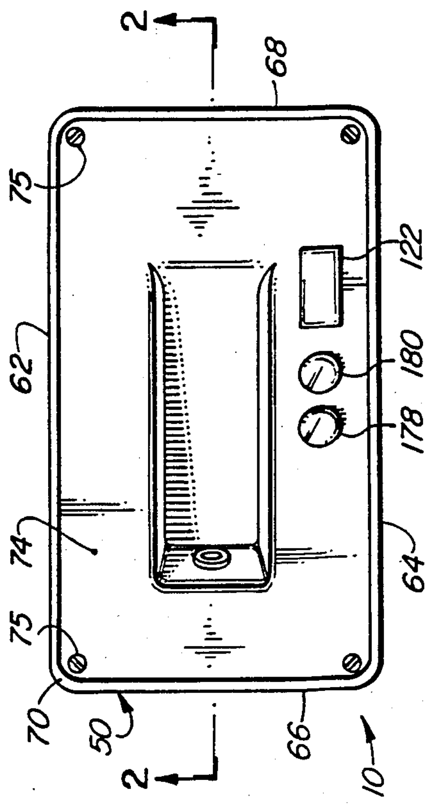
FIG. 4 is a top view of the case with its lid in an opened position.

With reference to FIGS. 1, 2 and 4, panel 74 is removably secured to the base in order to permit mounting and/or replacement of component parts of electrical circuitry 78. The panel is of unitary, generally planar construction and formed with a recess 110 shaped to receive the detector in a snug fit relation. The recess has a bottom wall 112 which is inclined with respect to the bottom wall of the base, a back wall 114 which extends substantially perpendicularly from bottom wall 112 and a pair of side walls 116, 118 which diverge slightly from one another. A jack 120 is secured to back wall 114 for electrical connection of circuitry 78 to the circuitry of the detector. Recesses may be formed in panel 74 for removably receiving a remote alarm unit, a confidence-giving test kit, a rain shield for the probe inlet, and other ancillary equipment (not shown).

The detector is provided with a plug 46 adapted to be detachably connected to jack 120 for providing electrical communication between the detector circuitry and the casing circuitry. The plug is located on back wall 48 of the detector and the position of jack 120 in back wall 114 of the recess corresponds with the position of plug 46 in back wall 48 of the detector so that, when inserting the detector in the casing, the detector is placed upon bottom wall 112 of the recess and slid therealong until the plug and jack matingly interconnect. Conversely, when removing the detector, it is simply slid upwardly along bottom wall 112. The detector is disposed in an inclined position so that its probe is removed from the boundary air layer of grass, bushes and the like which may exist at the site at which the device is used in the automatic mode.

Also secured to panel 74 is a liquid crystal display (LCD) 122, for dislaying the identity and concentration of detected chemical agents, a rotary switch 178 for selecting a horn 172 or light 174 or both, and a rotary switch 180 for setting the amplitude/intensity (cannot be zeroed) of the horn and light.

Lid 54 is arranged to be pivotally connected to the base along the edge portion of end wall 68 thereof and includes a stepped top wall 130, forwardly and rearwardly sloping, planar front and rear walls 132, 134, respectively, and diverging side walls 136 and 138. The end and side walls terminate in an edge 140 sized to abuttingly engage edge 70 of the base. As with the base, the walls of the lid are generally planar and substantially uninterrupted and the corners are rounded in order to facilitate decontamination. The base and lid together define a second chamber 142 which houses the detector when the lid is in its closed position. Front wall 132 is formed with an aperture 144 for communicating ambient air to the detector within chamber 142 when the device is used in the atmospheric air monitoring mode.

Light 174 is mounted in a lens 176 formed in the upper portion of top wall 130. The lens is integral with the top wall and smoothly merges into the planar surface of the wall as shown in order to facilitate decontamination of the top wall of the lid.

With reference to FIG 1, the apparatus also includes a remote display unit 200 for passing a warning of the presence of agents to another location such as inside a vehicle or shelter, or a tactical location. Unit 200 is connected to the case by means of appropriate electrical wire 202 connectable with jacks 102. The remote display unit includes a light 210 and a horn 212 controlled by switches 206 and 208 which function identically to light 174 and horn 172 with switches 178 and 180. It also includes a liquid crystal display 214 which functions identically to LCD 122. Switch 206 has positions for shutting off the remote display unit and for testing its operation. In an alternate embodiment of the invention, the display components 210, 212, 122, and their switches 178 and 180 are not present and only the remote display unit is used for warning.

FIG. 5 is a block diagram illustration of the electrical circuitry 78 of detector and alarm unit 10 and a diagrammatical cross-sectional view of detector 12. The detector is shown as having an output line 150 for communicating the amplified collector current to circuitry 78 via plug 46 and jack 120. When mounted in the case, the detector is connected to and powered by a power conditioner 152 via input line 154, which leads to and from an ON/OFF switch via jack 102, and to a polarity relay driver 156 via line 158. One input of power conditioner 152 is connected to jack 100 while another input is connected to an internal battery pack 153. Line 158 is connected, via plug 46 and jack 120, to the input of a polarity relay 160 added to the detector.

A first circuit 164 is responsive to the component of the signal in line 150 which represents the drift time of the peak or peaks by producing a signal which is representative of the identity of the chemical agent indicated by the peak and actuates a display driver 162, which, in turn, actuates a display 122. More specifically, circuit 164 compares the component of the signal representing the drift time(s) against each of a number of signals representing the drift times of known chemical agents. The output is produced when a match occurs.

A second circuit 166 is responsive to the component of the signal in line 150 which represents the height of the peak or peaks by calculating the concentration of the chemical agent indicated by the peak or peaks and supplies an appropriate signal to display driver 162, which, in turn actuates display 122. The display of the concentration may be in digital form providing a numerical value of the concentration or in the form of a series of sequentially operated lights or the like providing a semi-quantitative indication of the concentration.

A third circuit 168 compares the concentration determined by circuit 166 against a predetermined threshold level for the chemical agent identified by circuit 164 and provides an output signal along line 170 to horn 172, light 174 and a remote alarm driver 175 when the threshold is exceeded. The outputs of the three circuits are passed to the remote display unit 200 through jack 102. Telemetry techniques are used to pass the following information: alarm/no alarm, fault/no fault, (self-diagnostic check) agent identification, agent concentration, fault identification (such as low battery power).

A fourth circuit 182 is connected to polarity relay driver 156 via line 183 and switch 185. Circuit 182 is in the form of timer which provides an output on a cyclical basis so as to correspondingly effect a change in the polarity of the voltage source activating the detector circuitry. In this manner, it is possible to monitor both positive and negative ions which may be produced. The duty cycle may have any suitable value. Circuit 182 may be deactivated by switch 185 in the event that it is desired to monitor only positive ions.

Circuits 164, 166, 168 and 182 are comparable to circuitry developed for detector 12 and thus need not be described in further detail.

As mentioned, the device may be operated in a manual mode and an automatic mode. In the manual mode, the detector is used independently of the detector and alarm unit 10, is disconnected from jack 120 and operates under its own power. When the probe is positioned adjacent a surface to be tested, the detector draws in a sample of air from adjacent the surface and produces and feeds an electrical signal to the microprocessor circuit 40 which in turn activates the display.

In the automatic mode, the detector is placed within recess 110 of the case in the manner previously explained. The lid is closed and latched by handles 56. If desired, an external power source may be connected to jack 100. The remote display unit is connected to jack 102 if desired. The case is then placed at a desired monitoring site.

When it is desired to store the combination, the detector is placed in recess 110 of the casing. The lid is closed and the handles are moved to their overlying position. It will be seen from the foregoing, therefore, that the present invention provides a light and compact device which can readily be used in the manual and automatic modes and which includes all components necessary for use in these two modes. A significant feature of the apparatus is that all necessary components are stored within one enclosure.

In a particularly preferred form of the invention, the functions of circuits 164, 166, 168 and 182 are effected by a microprocessor, such as type CDP 1802, operating under the control of a program source such as, for example, a programmable read only memory (PROM), an erasable programmable read only memory (EPROM) or the like.

FIG. 6 illustrates an alternative case construction. Case 230 has a carrying handle 232 and a hinged lid or door 234. Case 230 is formed with an internal compartment 236 shaped and sized to receive the detector 12 in a snug fit relation. A detector holder 238 is removably mounted in the compartment by means of tabs 240 extending from the case and transverse pins 242 extending from the holder. The pins permit pivotal movement of the holder within the case so as to facilitate insertion and removal of the detector from the case 230. A jack 244 is secured to the holder for electrical connection to plug 46 of detector 12 and is connected to the electrical circuit of the detector and alarm unit 10 as explained earlier with reference to FIGS. 1–5.

Case 230 is formed with an external air intake and control device 250 which is in fluid communication with compartment 236 and with an air outlet passage 252 for exhausting air from the compartment to the exterior of the case. The case also includes an internal liquid crystal display 254 for either semiquantatively or quantatively displaying the concentration and identity of a detected chemical agent, an ON/OFF switch 256, a buzzer or horn 260 and a light 262. Switch 256 is mounted on the exterior surface of the case. Volume and intensity control knobs 268 and 270 are mounted in the case as shown. An actuating element 264 of a detector presence sensor is operably mounted within compartment 236 and serves to automatically deactivate the circuitry within case 230 when detector 12 is removed from case 230.

It will be understood that various modifications and alterations may be made to the aforementioned device without departing from the spirit of the invention.

The embodiments of the invention in which an exclusive property or privilege is claimed are defined as follows:

1. Apparatus for use with a hand-portable chemical agent detector for continuously monitoring an atmosphere for the presence of predetermined chemical agents, said detector having means for ionizing air samples and providing at an output terminal electrical signals representative of the mobility spectrum of ionized chemical vapours produced by said ionizing means, said apparatus comprising:

means defining a chamber in said apparatus for supporting and removably enclosing said detector;

means for communicating ambient atmosphere to said chamber;

electrical circuit means in said apparatus, said circuit means being adapted to be detachably connected to said detector output terminal when said detector is positioned in said chamber and being responsive to said electrical signals for producing an alarm signal when said signals detect a chemical agent concentration in said atmosphere exceeding a predetermined concentration level; and alarm means responsive to said alarm signal.

2. Apparatus as defined in claim 1, said alarm means including a visual indicator mounted on the exterior of said enclosure.

3. Apparatus as defined in claim 1, said alarm means including an audible indicator mounted in said enclosure.

4. Apparatus as defined in claim 1, said circuit means being further responsive to said signals for producing a further signal representative of the identity of a detected chemical agent and display means mounted on said apparatus and responsive to said further signal for displaying the identity of said detected chemical agent.

5. Apparatus as defined in claim 4, said detector ionizing means including electrical circuit means having an independent d.c. source of power, said apparatus further including a d.c. source of power mounted therein, and means for connecting said detector electrical circuit means to said source of power in said apparatus when said detector is disposed in said chamber.

6. Apparatus as defined in claim 5, said electrical circuit means in said apparatus including means for periodically reversing the polarity of said voltage applied to a drift region in said detector.

7. Apparatus as defined in claim 6, said apparatus including an external connector mean for selectively connecting said electrical circuit means in said apparatus to an external source of power.

8. Apparatus as defined in claim 1, said apparatus being adapted for removably supporting a remote alarm adapted to be connected to the alarm signal output of said circuit means.

9. Apparatus as defined in claim 1, further including, in combination, remote display means adapted to be electrically connected to said electrical circuit means for selectively actuating said circuit means from a location remote from said apparatus, said remote display means having alarm means responsive to said alarm signal.

10. Apparatus as defined in claim 9, said circuit means having means for periodically reversing the polarity of the voltage applied to a drift region in said detector, and said remote display means further including means for selectively activating said polarity reversing means.

11. Apparatus as defined in claim 1, said apparatus further including:

a body portion having a bottom wall adapted to be supported on a generally horizontal support surface, and integral upstanding side walls extending from said bottom wall and terminating in a first edge means, said bottom wall and said side walls having substantially uninterrupted exterior surfaces merging smoothly into one another and means in said first body portion for removably supporting said detector in a predetermined angular position with respect to said bottom wall; and a lid portion having a top wall and integral side walls depending from said top wall and terminating in second edge means arranged for abutting and mating engagement with said first edge means, said top and side walls having substantially uninterrupted exterior surfaces merging smoothly into one another, said lid portion being adapted to be movably mounted on said first body portion in edge to edge abutting engagement and define therewith an interior chamber for enclosing said detector, said lid portion having air inlet means for admitting ambient air into said chamber.

12. Apparatus as defined in claim 11, said means for removably supporting said detector including an electrical connector secured to said body portion and adapted to be detachably connected to a detector electrical connector having said output terminal.

13. Apparatus as defined in claim 12, said means for removably supporting said detector including a partition removably supported on said body portion side walls adjacent said first edge means and defining with said body portion a second chamber for enclosing said electrical circuit means and a d.c. source of power for said circuit means, said partition including a recess extending into said second chamber for receiving, at least in part, and supporting said detector at an angle to said bottom wall.

14. Apparatus as defined in claim 13, said electrical connector of said apparatus being secured to said partition within said recess.

15. Apparatus as defined in claim 13, said partition having a further recess adapted to removably receive a remote alarm.

16. Apparatus as defined in claim 15, said electrical circuit means including an external power connector secured to one of said body portion side walls for selective detachable connection of said electrical circuit to an external source of power, and a remote alarm connector secured to one of said body portion side walls for selectively communicating said alarm signal to a remote alarm.

17. Apparatus as defined in claim 16, said alarm means including a visual indicator mounted in said top wall of said lid, an audible indicator mounted in said body portion, and a remote alarm adapted to be connected to said remote alarm connector.

18. A chemical agent detecting and alarm apparatus for detecting the presence of predetermined chemical agents in an atmosphere and, if present, the concentration thereof, said apparatus being adapted to be used in a manual mode for analyzing vapours emanating from surfaces and the like suspected of being contaminated by said chemical agents and in an automatic mode for continuously monitoring ambient air, said apparatus comprising, in combination:

a hand-portable chemical agent detector having a housing, a chamber in said housing for ionizing air samples drawn thereinto, a rigid, air inlet probe for communicating ambient air samples to said chamber, an outlet for exhausting said samples from said chamber, pump means for admitting and exhausting said samples into and from said chamber, means responsive to ions produced in said chamber for producing a signal representative of the mobility spectrum of said ions, means responsive to said signal for determining the concentration and identity of chemical in said samples for producing an output signal representative thereof, display means responsive to said output signal for displaying the concentration and identity of detected chemical agents, a connector for outputting said signal produced by said ion responsive means, and a d.c. power supply in said housing for activating electrical circuitry in said detector during use of said detector in said manual mode;

a case for removably enclosing said detector, said case having a main body portion and a lid defining a chamber with said body portion, means within said chamber for detachably connecting said detector to said main body portion, said lid being movable between an opened position whereat said detector may be inserted into and removed from said chamber and a closed position for enclosing said detector, means in said lid for admitting ambient air into said chamber, electrical circuit means in said case having an electrical connector adapted to be detachably connected to said detector connector, said case electrical circuit means being responsive to a signal at said connector for determining the concentration of detected chemical agents and producing an alarm signal when a detected concentration exceeds a predetermined threshold, a d.c. power supply in said main body means for said electrical circuit means and means for connecting said power supply to said means for producing said mobility spectrum when said detector is disposed in said chamber; and remote display means for selectively activating said circuit means from a location remote from said case, said display means including alarms means responsive to said alarm signal;

said detector being operable in said manual mode independently of said case and said display means, and said detector, said case and said display means being operable as a unit in said automatic mode.

* * * * *